(12) United States Patent
Huang

(10) Patent No.: US 9,379,613 B1
(45) Date of Patent: Jun. 28, 2016

(54) POWER SUPPLY CIRCUIT AND NOTEBOOK COMPUTER INCLUDING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Zhao Huang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/587,865

(22) Filed: Dec. 31, 2014

(30) Foreign Application Priority Data

Dec. 18, 2014 (CN) .......................... 2014 1 0785985

(51) Int. Cl.
  *G06F 1/00* (2006.01)
  *H02M 3/158* (2006.01)
  *G06F 1/26* (2006.01)

(52) U.S. Cl.
  CPC *H02M 3/158* (2013.01); *G06F 1/26* (2013.01)

(58) Field of Classification Search
  CPC ........... G05F 1/3203; G05F 1/26; G05F 1/30;
  G05F 1/613; G05F 3/24; H02M 3/156;
  H02M 3/1588; H02M 3/1584; H02M 3/157;
  H02M 2001/007; B23K 11/248
  USPC ......... 713/300, 310, 320, 321, 324, 330, 340;
  323/222, 223–226, 265–266, 268,
  323/271–272, 282–285, 318, 351
  See application file for complete search history.

(56) References Cited

U.S. PATENT DOCUMENTS

| 7,796,459 B2 * | 9/2010 | Wang ...................... G11C 5/147 365/226 |
| 2008/0203982 A1 * | 8/2008 | Chen ......................... G06F 1/28 323/266 |
| 2013/0319668 A1 * | 12/2013 | Tschetter .............. E21B 43/261 166/281 |

* cited by examiner

*Primary Examiner* — Nguyen Tran
(74) *Attorney, Agent, or Firm* — ScienBiziP, P.C.

(57) ABSTRACT

The disclosure provides a power supply circuit including a pulse width modulator (PWM), a first voltage conversion unit, a second voltage conversion unit, a conversion chip, and a delay unit. The first voltage conversion unit converts a voltage of a power supply to a first voltage according to pulse signals output by the PWM. The second voltage conversion unit converts the voltage of the power supply to a second voltage according to the pulse signals. The conversion chip converts the first voltage to a third voltage, converts the second voltage to a fourth voltage, and outputs a power-good signal to a south bridge chipset through the delay unit. The disclosure also provides a notebook computer including the power supply circuit.

12 Claims, 3 Drawing Sheets

POWER SUPPLY CIRCUIT AND NOTEBOOK COMPUTER INCLUDING THE SAME

FIELD

The subject matter herein generally relates to notebook computers, and particularly relates to a notebook computer including a power supply circuit.

BACKGROUND

For a notebook computer powered by a power adapter, the power adapter may output a single voltage to a voltage conversion unit of the notebook computer. The voltage conversion unit may convert the single voltage into different voltages, such as 3V3, 5V_SYS, 5V_STBY, 12V_SYS voltages, and a power-good signal, and outputs the different voltages and the power-good signal to a motherboard of the notebook computer. However, if time sequences of the different voltages and the power-good signal output from the voltage conversion unit do not satisfy a time sequence required by the motherboard, the notebook computer may not be able to operate.

BRIEF DESCRIPTION OF THE DRAWINGS

Implementations of the present technology will now be described, by way of example only, with reference to the attached figures.

DETAILED DESCRIPTION

Figure 1:
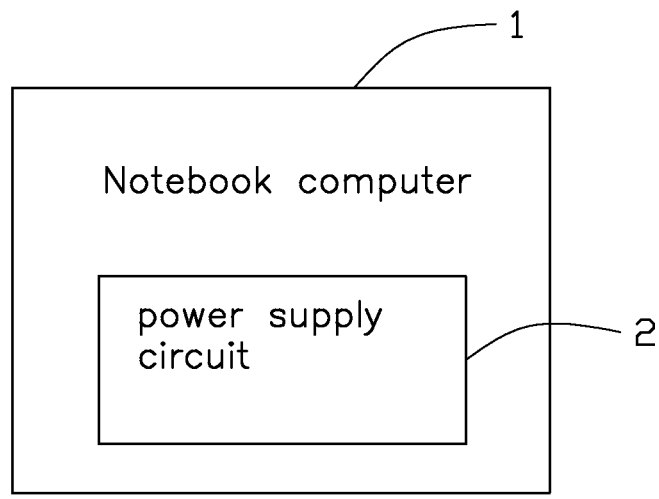
FIG. 1 is a block diagram of an embodiment of a notebook computer of the present disclosure, the notebook computer comprising a power supply circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrates details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

FIG. 1 illustrates an embodiment of a notebook computer 1 of the present disclosure. The notebook computer 1 can comprise a power supply circuit 2.

Figure 2:
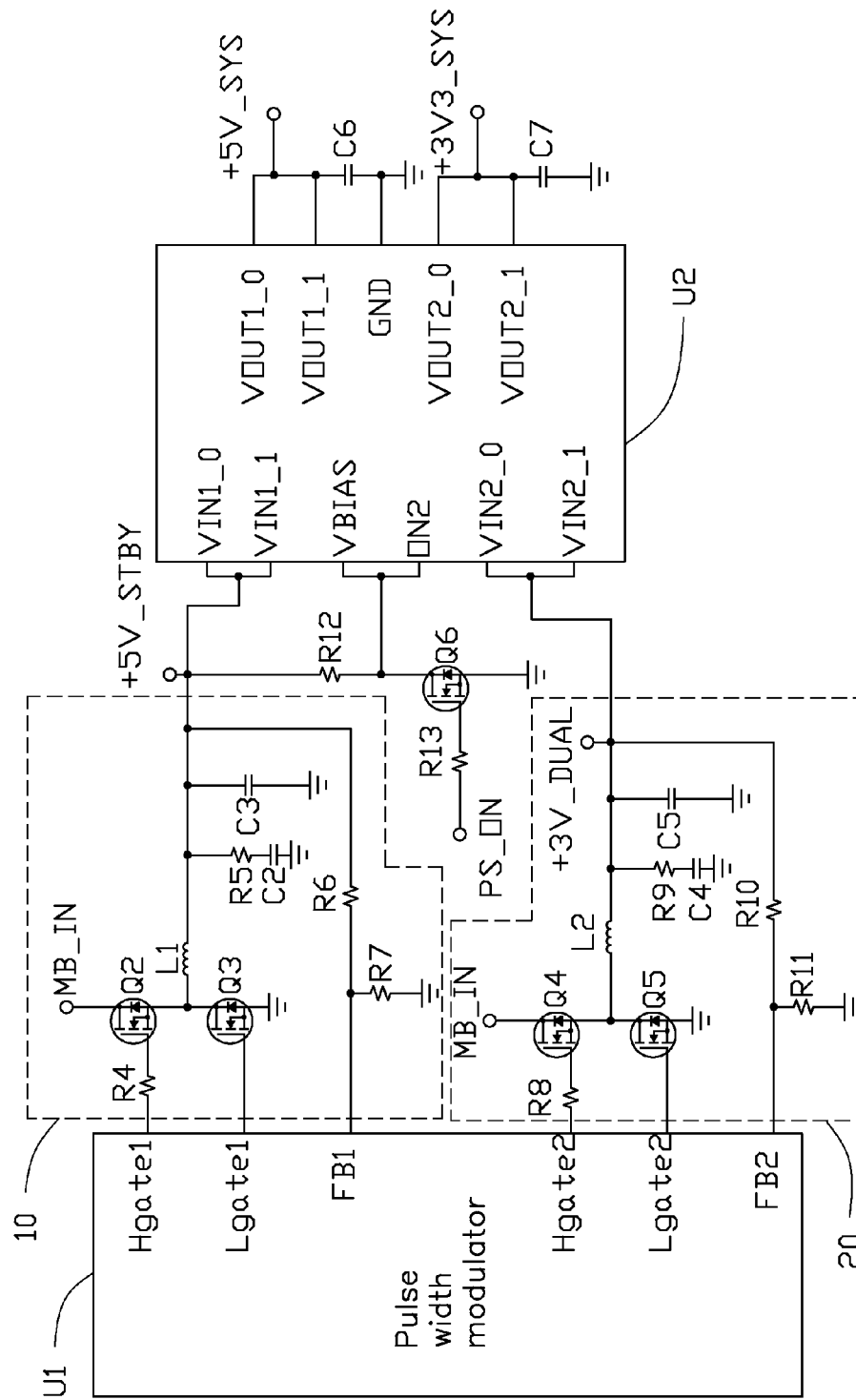
FIG. 2 is a circuit diagram of an embodiment of the power supply circuit of the FIG. 1.
Figure 3:
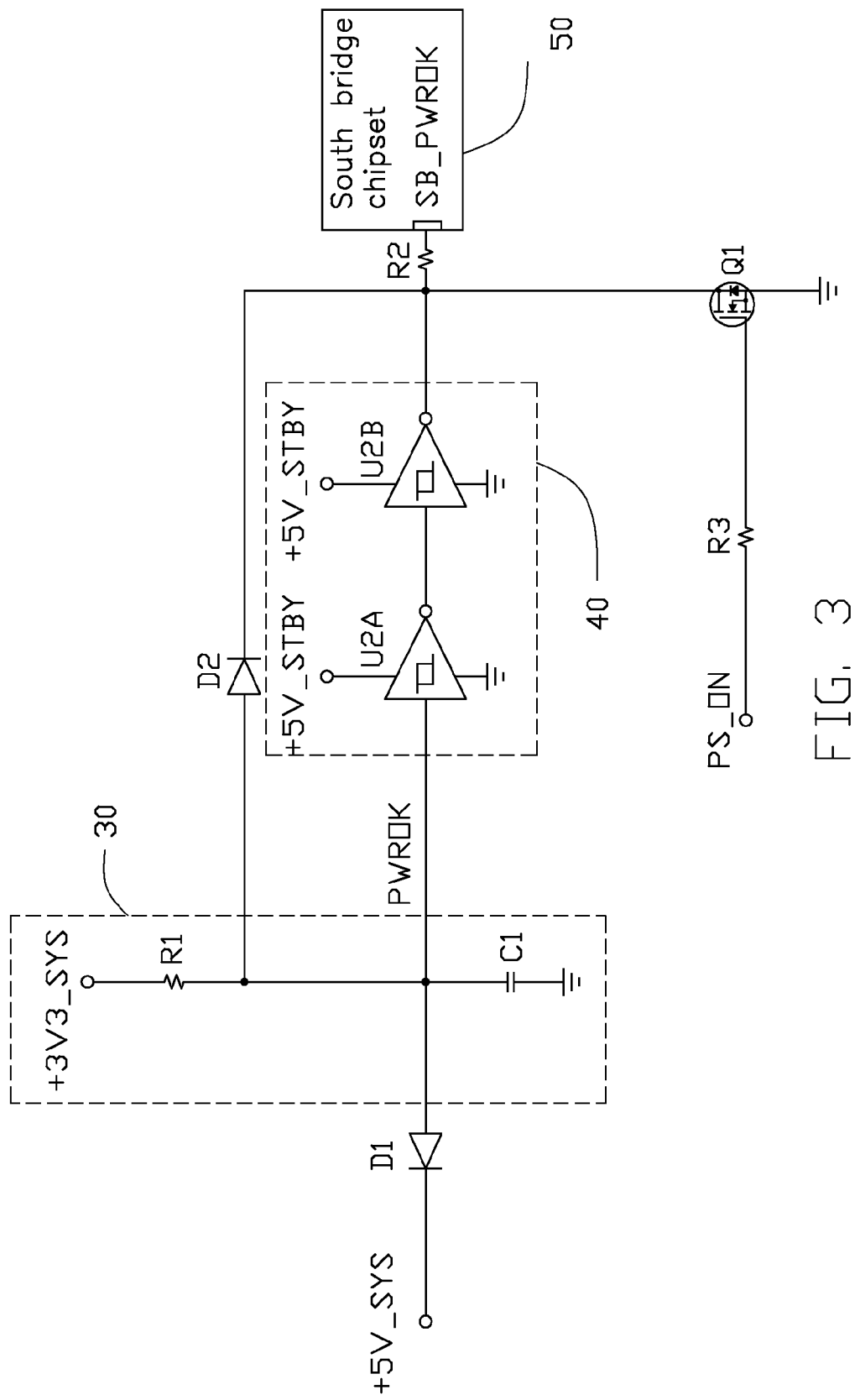
FIG. 3 is a circuit diagram of an embodiment of the power supply circuit of the FIG. 1.

FIGS. 2 and 3 illustrate an embodiment of the power supply circuit 2. The power supply circuit 2 can comprise a pulse width modulator (PWM) U1, a first voltage conversion unit 10, a second voltage conversion unit 20, a conversion chip U2, a delay unit 30, a Schmidt trigger unit 40, a south bridge chipset 50, two field effect transistors (FETs) Q1 and Q6, two resistors R12 and R13, two capacitors C6 and C7, and two diodes D1-D2.

The first voltage conversion unit 10 can comprise an inductor L1, four resistors R4-R7, two capacitors C2 and C3, and two FETs Q2 and Q3. A drain of the FET Q2 is electrically coupled to a power supply MB_IN. A gate of the FET Q2 is electrically coupled to a first pin Hgate1 of the PWM U1 through the resistor R4. A source of the FET Q2 is electrically coupled to a drain of the FET Q3. A gate of the FET Q3 is electrically coupled to a second pin Lgate1 of the PWM U1. A source of the FET Q3 is electrically coupled to ground. A first terminal of the inductor L1 is electrically coupled to the source of the FET Q2, and a second terminal of the inductor L1 is electrically coupled to ground through the capacitor C3. The resistor R5 and the capacitor C2 are electrically connected in series between the second terminal of the inductor L1 and ground. A third pin FB1 of the PWM U1 is electrically coupled to the second terminal of the inductor L1 through the resistor R6, and is electrically coupled to ground through the resistor R7.

The second voltage conversion unit 20 can comprise an inductor L2, four resistors R8-R11, two capacitors C4 and C5, and two FETs Q4 and Q5. A drain of the FET Q4 is electrically coupled to the power supply MB_IN. A gate of the FET Q4 is electrically coupled to a fourth pin Hgate2 of the PWM U1 through the resistor R8. A source of the FET Q4 is electrically coupled to a drain of the FET Q5. A gate of the FET Q5 is electrically coupled to a fifth pin Lgate2 of the PWM U1, a source of the FET Q5 is electrically coupled to ground. A first terminal of the inductor L2 is electrically coupled to the source the FET Q4, and a second terminal of the inductor L2 is electrically coupled to ground through the capacitor C5. The resistor R9 and the capacitor C4 are electrically connected in series between the second terminal of the inductor L2 and ground. A sixth pin FB2 of the PWM U1 is electrically coupled to the second terminal of the inductor L2 through the resistor R10, and is electrically coupled to ground through the resistor R11.

The first voltage conversion unit 10 converts a voltage of the power supply MB_IN into a voltage +5V_STBY according to a pulse signal output by PWM U1. The second voltage conversion unit 20 converts the voltage of the power supply MB_IN into a voltage +3V_DUAL according to the pulse signal output by PWM U1.

A drain of the FET Q6 obtains the voltage +5V_STBY output by first voltage conversion unit 10 through a resistor R12. A gate of the FET Q6 is electrically coupled to a motherboard (not shown) through a resistor R13, to receive a power-on signal PS_ON from the motherboard and a source of the FET Q6 is electrically coupled to ground.

Both a pin VIN1_0 and a pin VIN1_1 of the conversion chip U2 can obtain the voltage +5V_STBY from first voltage conversion unit 10, and both a pin VIN2_0 and a pin VIN2_1 of the conversion chip U2 can obtain the voltage +3V_DUAL from the second voltage conversion unit 20. Both a pin VBIAS and a pin ON2 of the conversion chip U2 are electrically coupled to the drain of the FET Q6. A pin VOUT2_0 of the conversion chip U2 is electrically coupled to a pin VOUT2_1 of the conversion chip U2, and is electrically coupled to ground through the capacitor C7. A pin VOUT1_0 of the conversion chip U2 is electrically coupled to a pin VOUT1_1 of the conversion chip U2, and is electrically coupled to ground through the capacitor C6. A pin GND of the conversion chip U2 is electrically coupled to ground. The pins VOUT2_0 and VOUT2_1 of the conversion chip U2 can output a voltage +3V3_SYS, and the pins VOUT1_0 and VOUT1_1 of the conversion chip U2 can output a voltage +5V_SYS.

The delay unit 30 can comprise a resistor R1 and a capacitor C1. A cathode of the diode D1 obtains the voltage +5V_SYS. An anode of the diode D1 obtains the voltage +3V3_SYS through the resistor R1 and is electrically coupled to ground through the capacitor C1. A node between the resistor R1 and the capacitor C1 functions as an output terminal of the delay unit 30 to output a power-good signal PWROK.

The Schmidt trigger unit 40 can comprise two Schmidt triggers U2A and U2B. Each of the Schmidt triggers U2A and U2B can comprise an input terminal, an output terminal, a power terminal, and a ground terminal. Both the ground terminals of the Schmidt triggers U2A and U2B are electrically coupled to ground, and both the power terminals of the Schmidt triggers U2A and U2B can obtain the voltage +5V_STBY. The input terminal of the Schmidt trigger U2A is electrically coupled to the anode of the diode D1. The output terminal of the Schmidt trigger U2A is electrically coupled to the input terminal of the Schmidt trigger U2B. The output terminal of the Schmidt trigger U2B is electrically coupled to a pin SB_PWROK of the south bridge chipset 50 through a resistor R2, and is electrically coupled to a drain of the FET Q1, and is electrically coupled to a cathode of the diode D2. An anode of the diode D2 is electrically coupled to ground through the capacitor C1. A gate of the FET Q1 is electrically coupled to the motherboard through the resistor R3, to obtain the power-on signal PS_ON from the motherboard. A source of the FET Q1 is electrically coupled to ground.

When the notebook computer 1 is powered on, the motherboard outputs the power-on signal PS_ON at a low-voltage level, such as logic 0, to turn off the FETs Q1 and Q6. The first voltage conversion unit 10 converts the voltage of the power supply MB_IN into the voltage +5V_STBY according to the pulse signal output by the PWM U1, and the second voltage conversion unit 20 converts the voltage of the power supply MB_IN into the voltage +3V_DUAL according to the pulse signal output by the PWM U1. The conversion chip U2 obtains the voltage +3V_DUAL and the voltage +5V_STBY, and converts the voltage +5V_STBY obtained from the first voltage conversion unit 10 into the voltage +5V_SYS The conversion chip U2 further converts the voltage +3V_DUAL obtained from the first voltage conversion unit 10 into the voltage +3V3_SYS. The diode D1 is turned off, and the capacitor C1 is charged by the voltage +3V3_SYS through the resistor R1. When the capacitor C1 is fully charged, the delay unit 30 then outputs the power-good signal PWROK at a high-voltage level to the pin SB_PWROK of the south bridge chipset 50 through the Schmidt trigger unit 40. In at least one embodiment, a delay time of the delay unit 30 is about 100-500 ms. In other embodiments, the delay time of the delay unit 30 can be adjusted by adjusting a capacitance of the capacitor C1 and a resistance of the resistor R1.

In at least one embodiment, the Schmidt trigger unit 40 can filter noise signals, to make the delay unit 30 output the power-good signal PWROK stably to the south bridge chipset 50. The south bridge chipset 50 starts operating normally when the pin SB_PWROK of the south bridge chipset 50 obtains the power-good signal PWROK at a high-voltage level.

When the notebook computer 1 is turned off, the power-on signal PS_ON is at the high-voltage level, such as logic 1, to turn on the FETs Q1 and Q6. When the FET Q6 is turned on, the pins VIN1_0 and VIN1_1 of the conversion chip U2 are electrically coupled to ground through the resistor R12 and the FET Q6, voltages of the pins VIN1_0 and VIN1_1 of the conversion chip U2 are pulled to a low level, such as a logic 0, and the conversion chip U2 fails to output the voltage +5V_SYS. The capacitor C1 is discharged through the diode D2 and the FET Q1 when the FET Q1 is turned on, and the diode D2 is turned on. The pin SB_PWROK of the south bridge chipset 50 is electrically coupled to ground through the FET Q1, and a voltage of the pin SB_PWROK of the south bridge chipset 50 maintains a low level, regardless of the power-good signal PWROK output from the delay unit 30 being at a high level or a low level. Therefore, malfunction caused by fluctuation of the power-good signal PWROK can be effectively prevented.

In other embodiments, the FET Q1-Q6 can be replaced by npn-type bipolar junction transistors or other electronic switches or other suitable switch having similar functions.

The embodiments shown and described above are only examples. Many details are often found in the art such as the other features of the notebook computer. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power supply circuit comprising:
a first diode comprising an anode and a cathode;
a first electronic switch and a second electronic switch, each of the first electronic switch and the second electronic switch comprising a first terminal, a second terminal, and a third terminal;
a pulse width modulator (PWM) configured to generate a pulse signal;
a first voltage conversion unit obtaining the pulse signal from the PWM, and configured to convert a voltage of a first power supply into a first voltage according to the pulse signal outputted by PWM;
a second voltage conversion unit obtaining the pulse signal from the PWM, and configured to convert the voltage of the first power supply into a second voltage according to the pulse signal outputted by PWM;
a conversion chip obtaining the first voltage from the first voltage conversion unit and the second voltage from the second voltage conversion unit, and configured to convert the first voltage into a third voltage and the second voltage into a fourth voltage; and
a delay unit comprising a first resistor and a first capacitor;
wherein the cathode of the first diode obtains the fourth voltage from the conversion chip, the anode of the first diode obtains the third voltage from the conversion chip through the first resistor, and the anode of the first diode is electrically coupled to ground through the first capacitor, the first terminal of the first electronic switch obtains the first voltage from the first voltage conversion unit through a second resistor, the second terminal of the first electronic switch obtains a power-on signal through a third resistor, the third terminal of the first electronic switch is electrically coupled to ground;

wherein the first terminal of the second electronic switch is electrically coupled to a node between the first resistor and the first capacitor, the second terminal of the second electronic switch obtains the power-on signal through a fourth resistor, the third terminal of the second electronic switch is electrically coupled to ground; the node between the first resistor and the first capacitor is configured to output a power-good signal;

wherein when the power-on signal is at a high-voltage level, the first electronic switch is turned on, the second electronic switch is turned on, the node between the first resistor and the first capacitor outputs the power-good signal at a low-voltage level; and wherein when the power-on signal is at a low-voltage level, the first electronic switch is turned off, the second electronic switch is turned off, the first diode is turned off, the node between the first resistor and the first capacitor outputs the power-good signal at a high-voltage level.

2. The power supply circuit of claim 1, wherein the PWM further comprises first to third pin, the first conversion voltage further comprises:

a third electronic switch and a fourth electronic switch, each the third electronic switch and the fourth electronic switch comprising a first terminal, a second terminal, and a third terminal;

fifth to eighth resistors;

a second capacitor and a third capacitor; and a first inductor comprises a first terminal and a second terminal;

wherein the first terminal of the third electronic switch is electrically coupled to the first power supply, the second terminal of the third electronic switch is electrically coupled to the first pin of the PWM through the fifth resistor, the third terminal of the third electronic switch is electrically coupled to the first terminal of the fourth electronic switch, the second terminal of the fourth electronic switch is electrically coupled to the second pin of the PWM, the third terminal of the fourth electronic switch is electrically coupled to ground; the first terminal of the first inductor is electrically coupled to a node between the third terminal of the third electronic switch and the first terminal of the fourth electronic switch, the sixth resistor and the second capacitor are electrically connected in series between the second terminal of the first inductor and ground, the second terminal of the first inductor is electrically coupled to ground through the third capacitor, the third pin of the PWM is electrically coupled to the second terminal of the first inductor through the seventh resistor, and is electrically coupled to ground through the eighth resistor.

3. The power supply circuit of claim 2, wherein the PWM further comprises fourth to sixth pin, the second conversion voltage further comprises:

a fifth electronic switch to a sixth electronic switch, each of the fifth electronic switch and the sixth electronic switch comprising a first terminal, a second terminal, and a third terminal;

ninth to twelfth resistor;

a fourth capacitor to a fifth capacitor; and a second inductor comprises a first terminal and a second terminal;

wherein the first terminal of the fifth electronic switch is electrically coupled to the first power supply, the second terminal of the fifth electronic switch is electrically coupled to fourth pin of the PWM through the ninth resistor, the third terminal of the fifth electronic switch is electrically coupled to the first terminal of the sixth electronic switch, the second terminal of the sixth electronic switch is electrically coupled to the fifth pin of the PWM, the third terminal of the sixth electronic switch is electrically coupled to ground; the first terminal of the second inductor is electrically coupled to a node between the third terminal of the fifth electronic switch and the first terminal of the sixth electronic switch, the tenth resistor and the fourth capacitor are electrically connected in series between the second terminal of the second inductor and ground, the second terminal of the second inductor is electrically coupled to ground through the fifth capacitor, the sixth pin of the PWM is electrically coupled to the second terminal of the second inductor through the eleventh resistor, and is electrically coupled to ground through the twelfth resistor.

4. The power supply circuit of claim 3, wherein the power supply circuit further comprises a Schmidt trigger unit and a south bridge chipset, the Schmidt trigger unit comprises a first Schmidt trigger and a second Schmidt trigger, each of the first Schmidt trigger and the second Schmidt trigger comprises an input terminal, an output terminal, a ground terminal, and a power terminal; wherein the input terminal of the first Schmidt trigger is electrically coupled to the node between the first capacitor and the first resistor, the input terminal of the second Schmidt trigger is electrically coupled to the output terminal of the first Schmidt trigger; the output terminal of the second Schmidt trigger is electrically coupled to the south bridge chipset through a thirteenth resistor; both the power terminals of the first and the second Schmidt triggers obtain the first voltage from the first voltage conversion unit; both the ground terminals of the first and the second Schmidt triggers are electrically coupled to ground.

5. The power supply circuit of claim 4, wherein the power supply circuit further comprises a second diode, a cathode of the second diode is electrically coupled to ground through the first capacitor, and an anode of the second diode is electrically coupled to the output terminal of the second Schmidt trigger.

6. The power supply circuit of claim 3, wherein the first to sixth electronic switches are n-channel metal oxide semiconductor field effect transistors (NMOSFETs) or npn-type bipolar junction transistors (BJTs), and the first terminals, second terminals, and the third terminals of the first to sixth electronic switches are drains, gates, and sources of the NMOSFETs or are collector, base, and emitter of the npn-type BJTs, respectively.

7. A notebook computer comprising:

a power supply circuit comprising:

a first diode comprising an anode and a cathode;

a first electronic switch and a second electronic switch, each of the first electronic switch and the second electronic switch comprising a first terminal, a second terminal, and a third terminal;

a pulse width modulator (PWM) configured to generate a pulse signal;

a first voltage conversion unit obtaining the pulse signal from the PWM, and configured to convert a voltage of a first power supply into a first voltage according to the pulse signal outputted by PWM;

a second voltage conversion unit obtaining the pulse signal from the PWM, and configured to convert the voltage of the first power supply into a second voltage according to the pulse signal outputted by PWM;

a conversion chip obtaining the first voltage from the first voltage conversion unit and the second voltage from the second voltage conversion unit, and configured to convert the first voltage into a third voltage and the second voltage into a fourth voltage; and a delay unit comprising a first resistor and a first capacitor;

wherein the cathode of the first diode obtains the fourth voltage from the conversion chip, the anode of the first diode obtains the third voltage from the conversion chip through the first resistor, and the anode of the first diode is electrically coupled to ground through the first capacitor, the first terminal of the first electronic switch obtains the first voltage from the first voltage conversion unit through a second resistor, the second terminal of the first electronic switch obtains a power-on signal through a third resistor, the third terminal of the first electronic switch is electrically coupled to ground;

wherein the first terminal of the second electronic switch is electrically coupled to a node between the first resistor and the first capacitor, the second terminal of the second electronic switch obtains the power-on signal through a fourth resistor, the third terminal of the second electronic switch is electrically coupled to ground; the node between the first resistor and the first capacitor is configured to output a power-good signal;

wherein when the power-on signal is at a high-voltage level, the first electronic switch is turned on, the second electronic switch is turned on, the node between the first resistor and the first capacitor outputs the power-good signal at a low-voltage level; and wherein when the power-on signal is at a low-voltage level, the first electronic switch is turned off, the second electronic switch is turned off, the first diode is turned off, the node between the first resistor and the first capacitor outputs the power-good signal at a high-voltage level.

8. The notebook computer of claim 7, wherein the PWM further comprises first to third pin, the first conversion voltage further comprises:

a third electronic switch and a fourth electronic switch, each the third electronic switch and the fourth electronic switch comprising a first terminal, a second terminal, and a third terminal;

fifth to eighth resistors;

a second capacitor and a third capacitor; and a first inductor comprises a first terminal and a second terminal;

wherein the first terminal of the third electronic switch is electrically coupled to the first power supply, the second terminal of the third electronic switch is electrically coupled to the first pin of the PWM through the fifth resistor, the third terminal of the third electronic switch is electrically coupled to the first terminal of the fourth electronic switch, the second terminal of the fourth electronic switch is electrically coupled to the second pin of the PWM, the third terminal of the fourth electronic switch is electrically coupled to ground; the first terminal of the first inductor is electrically coupled to a node between the third terminal of the third electronic switch and the first terminal of the fourth electronic switch, the sixth resistor and the second capacitor are electrically connected in series between the second terminal of the first inductor and ground, the second terminal of the first inductor is electrically coupled to ground through the third capacitor, the third pin of the PWM is electrically coupled to the second terminal of the first inductor through the seventh resistor, and is electrically coupled to ground through the eighth resistor.

9. The notebook computer of claim 8, wherein the PWM further comprises fourth to sixth pin, the second conversion voltage further comprises:

a fifth electronic switch to a sixth electronic switch, each of the fifth electronic switch and the sixth electronic switch comprising a first terminal, a second terminal, and a third terminal;

ninth to twelfth resistor;

a fourth capacitor to a fifth capacitor; and a second inductor comprises a first terminal and a second terminal;

wherein the first terminal of the fifth electronic switch is electrically coupled to the first power supply, the second terminal of the fifth electronic switch is electrically coupled to fourth pin of the PWM through the ninth resistor, the third terminal of the fifth electronic switch is electrically coupled to the first terminal of the sixth electronic switch, the second terminal of the sixth electronic switch is electrically coupled to the fifth pin of the PWM, the third terminal of the sixth electronic switch is electrically coupled to ground; the first terminal of the second inductor is electrically coupled to a node between the third terminal of the fifth electronic switch and the first terminal of the sixth electronic switch, the tenth resistor and the fourth capacitor are electrically connected in series between the second terminal of the second inductor and ground, the second terminal of the second inductor is electrically coupled to ground through the fifth capacitor, the sixth pin of the PWM is electrically coupled to the second terminal of the second inductor through the eleventh resistor, and is electrically coupled to ground through the twelfth resistor.

10. The notebook computer of claim 9, wherein the power supply circuit further comprises a Schmidt trigger unit and a south bridge chipset, the Schmidt trigger unit comprises a first Schmidt trigger and a second Schmidt trigger, each of the first Schmidt trigger and the second Schmidt trigger comprises an input terminal, an output terminal, a ground terminal, and a power terminal; wherein the input terminal of the first Schmidt trigger is electrically coupled to the node between the first capacitor and the first resistor, the input terminal of the second Schmidt trigger is electrically coupled to the output terminal of the first Schmidt trigger; the output terminal of the second Schmidt trigger is electrically coupled to the south bridge chipset through a thirteenth resistor; both the power terminals of the first and the second Schmidt triggers obtain the first voltage from the first voltage conversion unit; both the ground terminals of the first and the second Schmidt triggers are electrically coupled to ground.

11. The notebook computer of claim 10, wherein the power supply circuit further comprises a second diode, a cathode of the second diode is electrically coupled to ground through the first capacitor, and an anode of the second diode is electrically coupled to the output terminal of the second Schmidt trigger.

12. The notebook computer of claim 9, wherein the first to sixth electronic switches are n-channel metal oxide semiconductor field effect transistors (NMOSFETs) or npn-type bipolar junction transistors (BJTs), and the first terminals, second terminals, and the third terminals of the first to sixth electronic switches are drains, gates, and sources of the NMOSFETs or are collector, base, and emitter of the npn-type BJTs, respectively.

* * * * *